July 24, 1956 N. G. KINNA 2,756,087
CLAMPING RING FASTENER
Filed Nov. 12, 1954

Inventor:
Norman George Kinna
By his attorneys:
Baldwin & Wight

United States Patent Office 2,756,087
Patented July 24, 1956

2,756,087

CLAMPING RING FASTENER

Norman George Kinna, Seer Green, England, assignor to Bowaters Development and Research Limited, London, England, a company of Great Britain Application November 12, 1954, Serial No. 468,591

Claims priority, application Great Britain November 16, 1953

2 Claims. (Cl. 292—256.65)

This invention is a closure for the ends of a split clamping ring of the type that may be contracted to engage peripheral flanges formed on a lid and body of a drum or like container to keep the lid in position on the drum.

The object of the invention is to provide a simple and inexpensive closure for a clamping ring of the type described.

According to the invention a closure for the ends of a split clamping ring of the type described comprises two notched arms pivoted for swinging movement towards and away from clamping position about a common axis near one end of the ring and a projection fixed near the other end of the ring, the arms being adapted to be swung so that the projection is engaged by the notches, one arm being formed with a ramp leading to the notch to bear on the projection to draw the ends of the ring together and the other serving to complete the fastening, each arm being provided with a hole near the end remote from the pivot, the holes coming into register to permit the use of a sealing wire or the like only when the arms have been swung together to complete the closure.

In the preferred embodiment of the invention the arm having the ramp is provided with a flange to lie over the ring when the closure is completed. The clamping ring is of rectangular channel section and the projection is formed by a rivet the shank of which is fixed in the vertical part of the channel and the head of which is spaced apart from the ring sufficiently to accommodate the widths of the arms. The notched arms are made of sheet metal and are pivoted on the shank of a rivet secured in the clamping ring. In the closed position the tops of the notched arms are substantially level with the top of the clamping ring.

The invention is illustrated by way of example in the accompanying drawings in which.

Figure 1:
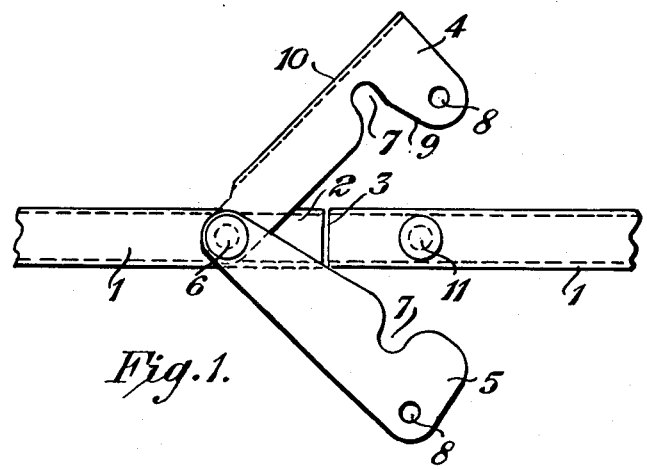
Figure 1 is an elevation of the closure in an open position.

Referring now to the drawings the split clamping ring 1 is of rectangular channel section and has adjacent ends 2, 3. Two arms 4, 5 made of sheet metal are pivoted near the end 2 about an extended shank portion of a rivet 6. Each arm has a notch 7 and a hole 8 and in addition the arm 4 is provided with a ramp 9 and a flange 10. The rivet 11, the shank of which is fixed to the ring near the end 3, provides the projection, the head of the rivet being spaced apart from the ring sufficiently to accommodate the widths of the arms.

Figure 2:
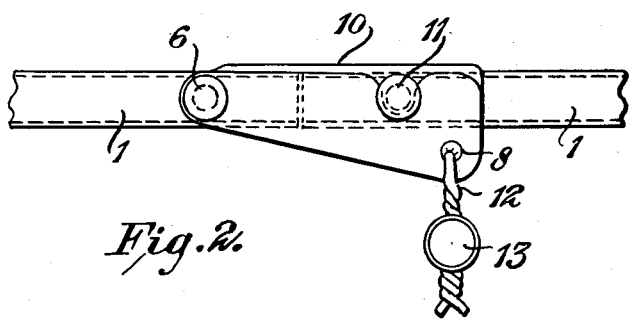
Figure 2 is an elevation of the closure in a closed position and sealed.
Figure 3:
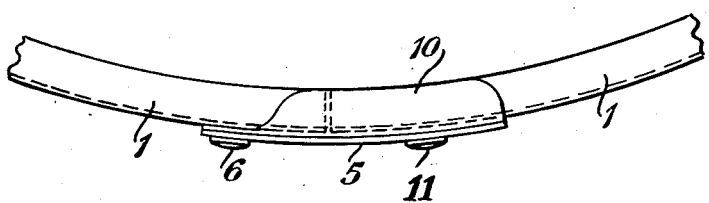
Figure 3 is a plan view of the closure in a closed position.

In operation the clamping ring is placed around the flanges on the lid and the container so that the ends of the ring are adjacent as shown in Figure 1. The arm 4 is then swung downwards towards clamping position so that the ramp 9 co-operates with the shank of the rivet 11 and draws the ends of the ring together. The arm is pushed down until the shank of the rivet engages in the notch 7 and the flange 10 lies upon the ring. The arm 5 is then swung upwards toward clamping position over the arm 4 until the shank of the rivet 11 enters the notch 7 and the holes 8 are in register. As will be seen from Figure 2 the tops of the notched arms are substantially level with the top of the clamping ring. A sealing wire 12 is then passed through the holes 8 and sealed as at 13.

When it is desired to open the container the wire 12 is broken and the closure is opened by swinging down the arm 5 and then swinging up the arm 4.

What is claimed is:

1. A closure for the ends of a split clamping ring comprising two arms; means mounting said arms on said ring for swinging movement towards and away from clamping position about a common axis adjacent to one end of said ring; and a projection fixed on and adjacent to the other end of said ring, one of said arms having a notch therein and a ramp portion leading from said notch, said ramp portion being operable when said one arm is swung towards clamping position to engage said projection to draw the ends of said ring together and to guide said projection into said notch, the other of said arms having a notch therein adapted when said other arm is swung towards clamping position to receive said projection and to assist said one arm in maintaining the ends of said ring together.

2. A closure for the ends of a split clamping ring comprising two arms; means mounting said arms on said ring for swinging movement towards and away from clamping position about a common axis adjacent to one end of said ring; and a projection fixed on and adjacent to the other end of said ring, one of said arms having a notch therein and a ramp portion leading from said notch, said ramp portion being operable when said one arm is swung towards clamping position to engage said projection to draw the ends of said ring together and to guide said projection into said notch, the other of said arms having a notch therein adapted when said other arm is swung towards clamping position to receive said projection and to assist said one arm in maintaining the ends of said ring together, each of said arms having an opening remote from said axis for receiving a sealing wire, said openings being registrable only when each of said arms is in clamping position.

References Cited in the file of this patent

UNITED STATES PATENTS

| | | |
|---|---|---|
| 971,058 | Luke | Sept. 27, 1910 |
| 2,082,881 | Fetter | June 8, 1937 |
| 2,703,248 | Mauer | Mar. 1, 1955 |